Patented Apr. 15, 1947

2,418,991

UNITED STATES PATENT OFFICE 2,418,991

POLYMERS OF UNSATURATED DERIVATIVES OF 3-SULFOLANOL

Edward C. Shokal, Oakland, and Rupert C. Morris, Berkeley, Calif., assignors to Shell Development Company, San Francisco, Calif., a corporation of Delaware No Drawing. Application August 19, 1943, Serial No. 499,286

6 Claims. (Cl. 260—79)

This invention relates to unsaturated derivatives of 3-sulfolanol and more particularly to resinous polymers thereof.

The potential value of sulfur in plastic materials has been recognized since the discovery that it makes possible the vulcanization of rubber. There have been developed a number of sulfur-containing plastics, notably the olefin-sulfur dioxide resins, urea-thioformaldehyde and the sulfonamide resins. Each of these has properties peculiar to itself which make it successful in a particular field. However, the uses of sulfur-containing resins are limited and there has been apparent for some time the need of combining selected properties of the sulfur resins with selected properties of ethenoid resins.

An object of the present invention is the production of new resins. A further object is the production of modified sulfur-containing resins. A further object is the production of resins from sulfur-containing monomers modified by the presence in the molecule of an ethylenically unsaturated carbon-to-carbon bond. A still further object is the production of resins having certain properties due to the presence of sulfur and other properties directly attributable to an ethenoid resin structure. Further objects will be apparent from the description given hereinafter.

These objects are accomplished in accordance with the invention by polymers of unsaturated ethers and thioethers of 3-sulfolanol. The monomeric compounds have the structure represented by the general structural formula:

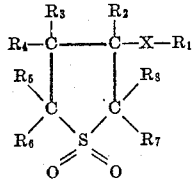

wherein X is O or S; $R_1$ is an unsaturated radical and $R_2$, $R_3$, $R_4$, $R_5$, $R_6$, $R_7$ and $R_8$ are each hydrogen, halogen or an organic radical, such as an alkyl, alkenyl, alkynyl, aralkyl, aryl, acyl, alicyclic, alicarbocyclic, or heterocyclic radical. Examples of organic radicals are methyl, ethyl propyl, isopropyl, normal butyl, isobutyl, secondary butyl, tertiary butyl, normal pentyl, isopentyl, secondary pentyl, hexyl, normal octyl, iso-octyl, normal decyl, isodecyl, dodecyl, tetradecyl, cetyl, stearyl, and trimethyl octodecyl, allyl, methallyl, crotyl, methyl vinyl carbinyl, butenyl, pentenyl, hexenyl, propargyl, geranyl, oleyl, phenyl, naphthyl, anthryl, tolyl, xylyl, secondary butyl-naphthyl, dipropyl-naphthyl, benzyl, naphthyl-butyl, phenethyl, vinyl-phenyl, crotonyl-naphthyl, methallyl-phenyl, triallyl-naphthyl, naphthyl-allyl, 2-phenyl-ethenyl, phenyl vinyl carbinyl, cinnamyl, acetyl, propionyl, caproyl, stearacyl, benzoyl, cyclopentyl, ethyl-cyclohexyl, tributyl-cyclohexyl, cyclopentenyl, cyclohexenyl, vinyl cyclohexenyl, thioenyl, furyl, butyl carbothionyl, octyl carbothionyl, decyl carbothionyl, etc.

For the purposes of the invention the most desirable unsaturated radicals ($R_1$) are those which have an unsaturated linkage of aliphatic character between two carbon atoms, one of which is joined to a saturated carbon atom from which stems a free valence of the radical. Of these a preferred group consists of allyl-type radicals, which are monovalent radicals having an olefinic double bond between two carbon atoms, one of which is joined to a saturated carbon atom from which stems the free valence of the radical. Allyl-type radicals have the structure

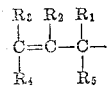

wherein each R is a substituent, such as hydrogen, halogen or an organic radical, preferably a hydrocarbon radical. In general, the most reactive allyl-type radicals have a terminal methylene group, i. e. they have the structure

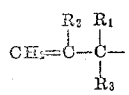

wherein each R is a substituent, such as hydrogen, halogen, or an organic radical. A preferred sub-group consists of those in which the free valence of the radical stems from a primary or secondary carbon atom, as indicated by the structural formula

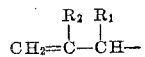

wherein each R is as previously stated for allyl-type radicals. In the compounds of the present invention, allyl-type radicals preferably have not more than about 18 carbon atoms and contain at least one unsaturated carbon-to-carbon linkage for each 6 carbon atoms.

Examples of preferred allyl-type radicals are allyl, methyl vinyl carbinyl, ethyl vinyl carbinyl, propyl vinyl carbinyl, methallyl, ethallyl, chloroallyl, propallyl, methyl isopropenyl carbinyl, ethyl isopropenyl carbinyl, and 2-ethyl propene-2-yl-1, hexene-1-yne-5-yl-3, pentadiene-1,4-yl-3, 2- methyl pentene-1-yne-4-yl-3, and 2,5-dimethyl hexadiene-1,5-yl-4. Other allyl-type radicals are dimethyl vinyl carbinyl, methyl ethyl vinyl carbinyl, diethyl vinyl carbinyl, dimethyl isopropenyl carbinyl, methyl ethyl isopropenyl carbinyl, diethyl isopropenyl carbinyl, 2-ethyl-3-methyl-butene-1-yl-3, crotyl, methyl propenyl carbinyl, ethyl propenyl carbinyl, dimethyl propenyl carbinyl, 1-methyl-2-methyl-butene-2-yl-1, 1-ethyl-2-methyl-butene-2-yl-1, isobutenyl carbinyl, cyclohexene-2-yl-1, cyclopentene-2-yl-1, cinnamyl, hexadiene-2,4-yl-1, hexadiene-2,5-yl-1, butadiene-2,3-yl-1, hexadiene-3,5-yl-2, 3,7-dimethyl octadiene-2,7-yl-1, etc.

As to the compounds of the invention a preferred subgroup consists of those in accordance with the first general structural formula given hereinabove wherein $R_1$ is an allyl-type radical, X is O and $R_2$, $R_3$, $R_4$, $R_5$, $R_6$, $R_7$ and $R_8$ are each an open-chain aliphatic hydrocarbon radical of from 1 to about 5 carbon atoms, examples of which radicals are methyl, ethyl, propyl, isopropyl, normal butyl, isobutyl, secondary butyl, tertiary butyl, normal pentyl, isopentyl and secondary pentyl. Representative examples of specific compounds are allyl 3-sulfolanyl ether, methallyl 3-sulfolanyl ether, chloroallyl 3-sulfolanyl ether, crotyl 3-sulfolanyl ether, methylvinylcarbinyl 3-sulfolanyl ether, allyl 4-methyl-3-sulfolanyl ether, etc.

3-sulfolanol is otherwise named 3-hydroxy-thiolene-1, 1-dioxide and 3-hydroxy cyclotetramethylene sulfone. It can be prepared by the addition of water to 3-sulfolene (which is 3-thiolene-1, 1-dioxide or beta-butadiene sulfone) or to 2-sulfolene (which is 2-thiolene-1, 1-dioxide or alpha-butadiene sulfone) in the presence of a strong base. The unsaturated ethers of 3-sulfolanol can be prepared by the addition of the corresponding unsaturated alcohol to 3-sulfolene or to 2-sulfolene in the presence of a strong base. The preparation of the unsaturated ethers is described in the co-pending application of Morris and Shokal, Serial No. 446,130, filed June 6, 1942. The thioethers can be prepared in a corresponding manner. The preparation of the sulfolenes is described in British Patent 361,341, German Patent 236,386, German Patent 506,839 and by Backer and Strating in Rec. trav. chim. 53, 525-543 (1934).

The compounds can be polymerized singly or in admixture with one another or with other polymerizable compounds. Among such other compounds are mono-ethylenic compounds, which contain a single polymerizable carbon-to-carbon double bond, of which an important subclass consists of those compounds containing in the molecule a terminal methylene group attached to carbon by an ethylenic double bond $CH_2=C<$. Examples of this subclass of compounds are styrene, alpha-methyl styrene, many vinyl and allyl derivatives, and the nitriles and many of the esters of acrylic and alpha-substituted acrylic acids.

Another group of co-polymerizable compounds consists of those compounds having two or more conjugated carbon-to-carbon double bonds, such as butadiene and substituted butadiene, as well as polymers of acetylene, such as vinyl and divinyl acetylene. Others are unsaturated cyclic compounds such as coumarone, indene, furfural and cyclohexene.

Some of the most important co-polymerizable compounds, however, have two or more polymerizable non-conjugated double bonds. Here an important subclass consists of the unsaturated aliphatic poly-esters of saturated polybasic acids, examples of which are divinyl, diallyl, and dimethallyl esters of oxalic, malonic, citric and tartaric acids, and the corresponding tri-esters of citric acid. Another subclass consists of the unsaturated aliphatic polyethers of saturated polyhydric alcohols, such as divinyl, diallyl and dimethallyl ethers of glycol, di-ethylene glycol, tri-ethylene glycol, trimethylene glycol, propylene glycol, the corresponding di- and tri-ethers of glycerol, and similar derivatives of diglycerol, triglycerol, mannitol, sorbitol, pentaerythritol and the like involving two or more hydroxyl groups of the polyhydric alcohol. Another subclass consists of the unsaturated aliphatic organic acid poly-esters of polyhydric alcohols, such as the acrylic and methacrylic poly-esters of glycol, diethylene glycol, propylene glycol, trimethylene glycol, ethylidene glycol, glycerol, diglycerol, mannitol, sorbitol and resorcinol. Other polymerizable unsaturated compounds containing two or more unsaturated carbon-to-carbon linkages unconjugated with respect to one another are the unsaturated aliphatic alcohol esters of the unsaturated aliphatic acids. Examples of these compounds are the vinyl, allyl, and methallyl esters of acrylic, methacrylic, chloro-acrylic, crotonic, itaconic, citraconic and cinnamic acids. Another class consists of the unsaturated polyesters of dibasic aromatic acids, such as divinyl, diallyl and dimethallyl esters of phthalic acid, isophthalic acid, terephthalic acid and the naphthalene dicarboxylic acids. Instead of the esters and ethers, the corresponding sulfur and nitrogen compounds, i. e. thio-esters, thio-ethers, amides and amines, may be used. The most important polymerizable compounds of the group having two or more polymerizable non-conjugated double bonds are, however, those containing oxygen.

The monomers of the invention may be polymerized also in the presence of already-formed plastics, including natural resins, cellulose derivatives and synthetic resins. Other modifiers, including plasticizers, stabilizers, lubricants, dyes, pigments and fillers, may be added to the monomer prior to polymerization or to partially polymerized material during polymerization, provided they do not chemically react with or otherwise adversely affect the ingredients of the reaction mixture. Otherwise, these modifiers may be added following polymerization. The nature and amount of the modifiers used will depend upon the particular material involved, upon the method of preparation and upon the intended use of the product.

The polymerization of the monomer is usually effected according to known procedures. The compounds can be polymerized in bulk in the absence of solvent or diluent to form ternary resins. Polymerization can be effected in solution in a substance which is a solvent for the monomer and polymer, or which is a solvent for the monomer but a non-solvent for the polymer. A useful modification of this procedure is polymerization in solution in a substance which is a hot-acting solvent for the polymer. Molding powder is conveniently formed by polymerization in dispersion in a non-solvent; in which case the dispersion may be a true emulsion or, more preferably, an impermanent suspension. Emulsifying, granulating and wetting agents may be present. It is also possible to effect polymerization by atomizing monomer or a solution thereof in the form of a fine spray into a heated chamber containing an inert gas. In all such cases the polymerization may be either continuous or discontinuous and may be conducted at atmospheric, superatmospheric or reduced pressure. It is likewise feasible to polymerize monomer dispersed in the interstices in the fibrous material such as a fabric. Further, it may be sometimes desirable to polymerize the monomer in the form of a thin sheet which may be subsequently stripped from the surface to which it has been applied or which may be left on the surface in the form of a coating.

Polymerization is usually energized by heat, although both heat and light can be used. Temperatures of about 60° C. to about 150° C. are preferred. Catalysts can be used to hasten polymerization. The common peroxide types of catalysts such as benzoyl peroxide, acetyl peroxide, benzoyl acetyl peroxide, lauryl peroxide and hydrogen peroxide are preferred. Oxygen and ozone markedly affect the rate of polymerization. In most cases persulfates can be used as catalysts. Polymerization of the monomer is retarded by polymerization inhibitors, such as, for example, hydroquinone and other di- and tri-hydroxy aromatic compounds. Inhibitors may be used to completely, or substantially completely, prevent the polymerization of monomeric material in storage or may be present in the material during polymerization, usually in the concurrent presence of a polymerization catalyst, for the purpose of controlling the rate thereof or of producing a product of certain desired properties.

The compounds will usually be substantially completely polymerized, in which case they may have a molecular weight of more than about 2,000. The material can, however, if desired, be only partially polymerized, yielding a syrup which can usually be subsequently subjected to more complete polymerization. An important process consists in the partial polymerization of the material in one vessel followed by the transfer of the material to another vessel (a mold) where the polymerization is completed. Syrup or monomer can be mixed with preformed polymer of the same or a different substance, forming a pourable mixture or a dough which is then solidified in a required shape by subjecting the mass in a mold to polymerization conditions, usually with the application of heat and pressure. Fibrous material, such as paper or cloth may be impregnated with monomer or syrup, followed by completion of the polymerization.

The products of the invention are thus normally liquid to solid, preferably solid, resinous polymers of selected derivatives of 3-sulfolanol and substituted 3-sulfolanol. They are usually substantially colorless and odorless. They can be produced in completely transparent form. Notable among the characteristics of the preferred compounds is their inherent flexibility which renders them suitable for many exacting uses without the addition of a plasticizer. This is especially important where polymers must be kept flexible while immersed in a liquid of such character that otherwise the selection of a proper plasticizer would involve a compromise between the desired plasticity characteristics of the polymer and the solubility characteristics of the plasticizer. They are resistant to weather and to the action of many solvent and swelling agents.

The solid resinous polymers can be produced as sheets, rods, tubes and filaments. They make desirable ternary resins. They can be cast in an infinite variety of shapes. They can be subjected to extrusion and to injection and compression molding in the presence or absence of added diluents. Laminated structures, particularly laminated paper structures, containing the polymers display remarkable flexibility. Some of the polymers form tough adherent flexible coatings. They may be used as electrical insulation. Fibrous sheet material impregnated with the polymers has the proper degree of stiffness for many applications. In sheets, alone or, preferably, supported upon an open-mesh framework, the material may be used as a glass substitute.

The following examples are given for the purpose of illustrating the invention and are not to be considered limiting. Parts are on a weight basis.

*Example I*

A mixture of 100 parts of allyl 3-sulfolanyl ether and 5 parts of benzoyl peroxide was held at 70° C. in a vessel open to the atmosphere. A strip of steel was coated by dipping into the resulting liquid polymer. The coated strip was baked in an oven at 150° C. for 20 minutes. The film was soft and flexible. Another strip similarly coated was baked at 210° C. for one hour. The film was hard and flexible.

*Example II*

A mixture of 25 parts of allyl 3-sulfolanyl ether, 75 parts of diallyl phthalate and 5 parts of benzoyl peroxide was held at 70° C. in an open vessel. The resulting polymer was a hard, infusible, slightly yellow resin.

*Example III*

100 parts of methallyl 3-sulfolanyl ether polymerized in the presence of 5 parts of benzoyl peroxide on heating at 65° C. for 290 hours. The liquid polymer could be used as a baking enamel.

*Example IV*

A mixture of allyl 3-sulfolanyl ether, 10 parts, and diallyl phthalate, 85 parts, gelled in less than 16 hours when held at 65° C. in the presence of about 5 parts of benzoyl peroxide. The completely polymerized material was a solid resin having a light straw color, and a Barcol hardness of 35–36.

*Example V*

30 parts of methallyl 3-sulfolanyl ether was polymerized with 255 parts of diallyl phthalate with about 14 parts of benzoyl peroxide at 65° C. The resulting straw-colored resin had a Barcol hardness of 30.

*Example VI*

A co-polymer of the 3-sulfolanyl ether of the a,a'-diallyl ether of glycerol with diallyl phthalate, in the ratio 10:85, produced by heating at 85° C. in the presence of 5% benzoyl peroxide, had a light straw color and a Barcol hardness of 36.

*Example VII*

Nonenyl 3-sulfolanyl ether, 10 parts, and diallyl phthalate, 85 parts, were heated in admixture with 5% of benzoyl peroxide at 65° C. for 290 hours. The solid resin had a Barcol hardness of 17.

*Example VIII*

A resin of light color was produced by co-polymerizing 3-sulfolanyl (methallyl carbinyl) ether, 10 parts, with diallyl phthalate, 85 parts, in the presence of 5% of benzoyl peroxide. The resin had a Barcol hardness of 38–39.

We claim as our invention:

1. A resin comprising a polymer of an ether of 3-sulfolanol, which ether has the structural formula:

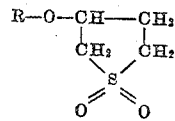

wherein R is an alken-2-yl radical of 3 to 18 carbon atoms.

2. A resin comprising a polymer of allyl 3-sulfolanyl ether, which ether has the structural formula:

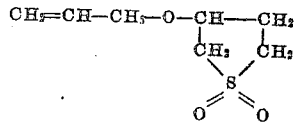

3. A resin comprising a polymer of methallyl 3-sulfolanyl ether, which ether has the structural formula:

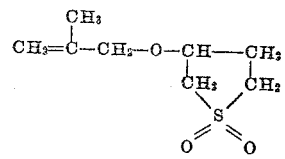

4. A polymer of an ether of 3-sulfolanol, which ether has the structural formula:

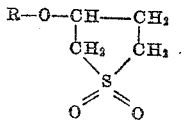

wherein R is an alken-2-yl radical of 3 to 18 carbon atoms.

5. A polymer of allyl 3-sulfolanyl ether, which ether has the structural formula:

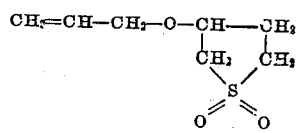

6. A polymer of methallyl 3-sulfolanyl ether, which ether has the structural formula:

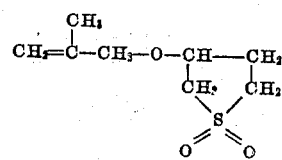

EDWARD C. SHOKAL.
RUPERT C. MORRIS.

REFERENCES CITED

The following references are of record in the file of this patent:

UNITED STATES PATENTS

| Number | Name | Date |
|---|---|---|
| 2,219,006 | Delfs | Oct. 22, 1940 |

OTHER REFERENCES

Schriner and Fuson, "Identification of Organic Compounds" pub. by Wiley, N. Y., 1940, pages 41 and 43.